No. 844,247. PATENTED FEB. 12, 1907.
C. T. CARNAHAN & J. MURPHY.
AUTOMATIC FEEDER FOR TOOLS.
APPLICATION FILED JULY 31, 1906.
2 SHEETS—SHEET 1.
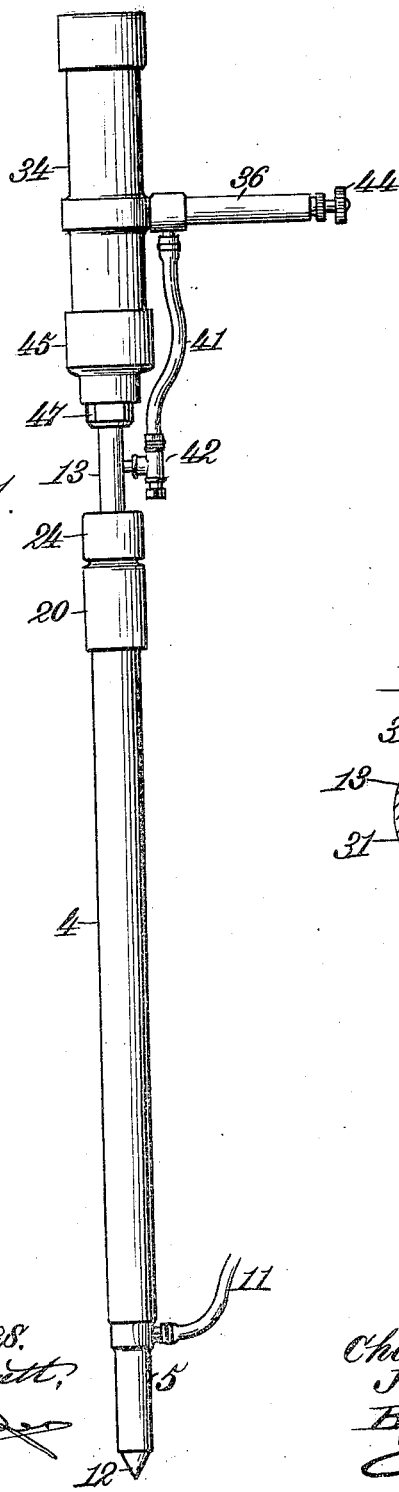
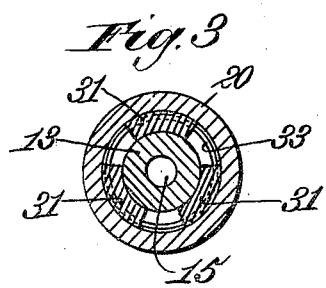
Witnesses.
Inventors
Charles T. Carnahan
Jeremiah Murphy,
By James L. Norris.
Atty.

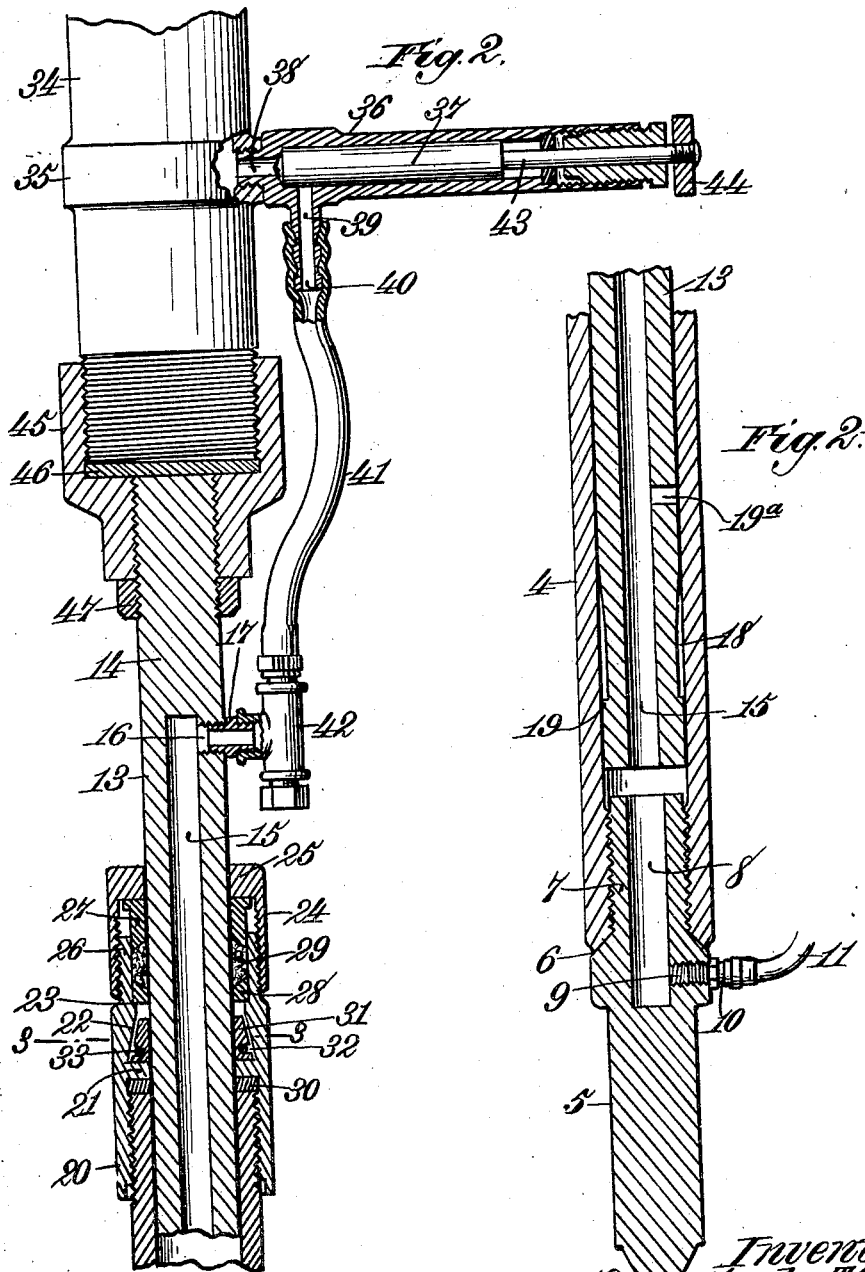

UNITED STATES PATENT OFFICE.

CHARLES TINGLEY CARNAHAN AND JEREMIAH MURPHY, OF DENVER, COLORADO; SAID MURPHY ASSIGNOR TO SAID CARNAHAN.

AUTOMATIC FEEDER FOR TOOLS.

No. 844,247.        Specification of Letters Patent.        Patented Feb. 12, 1907.

Application filed July 31, 1906. Serial No. 328,595.

*To all whom it may concern:*

Be it known that we, CHARLES T. CARNAHAN and JEREMIAH MURPHY, citizens of the United States, residing at Denver, in the county of Denver and State of Colorado, have invented new and useful Improvements in Automatic Feeders for Tools, of which the following is a specification.

This invention relates to automatic feeding devices for hand-tools, more particularly to that class termed "pneumatic" tools, and aims to provide a feeder in a manner as hereinafter set forth which is arranged in such relation with respect to the tool that the tool will be forced against its work by the feeder, and at the same time the tool can be freely rotated without twisting or straining the air connection between the tool and the feeder or the air-supply connection to the feeder.

The invention further aims to provide an automatic feeder for the purpose set forth with means for indicating to the operator that the feeder is about to the limit of its operative stroke, said means releasing the compressed air, so that the operator can readily push back the piston of the feeder.

The invention further aims to provide the feeder with means for locking the piston thereof at the limit of its stroke in one direction, thereby preventing the air forcing the piston entirely from its cylinder.

The invention further aims to provide a feeder and means for establishing communication between it and the tool, causing thereby a supply of motive fluid to and the operation of the tool.

The invention further aims to provide an automatic feeder for the purpose set forth which shall be simple in its construction, strong, durable, portable, efficient in its use, automatic in its action, and inexpensive to manufacture.

With the foregoing and other objects in view the invention consists in the novel construction, combination, and arrangement of parts hereinafter more specifically described, and illustrated in the accompanying drawings, which form a part of this specification, and wherein is shown the preferred embodiment of the invention; but it is to be understood that changes, variations, and modifications can be resorted to which come within the scope of the claims hereunto appended.

In describing the invention in detail reference is had to the accompanying drawings, wherein like reference characters denote corresponding parts throughout the several views, and in which—

Figure 1 is an elevation of an automatic feeder in accordance with this invention, showing the same coupled up to a pneumatic tool. Figs. 2 and 2ª when taken together illustrate a sectional elevation of the feeder coupled with the tool, and Fig. 3 is a transverse section on line 3 3.

Referring to the drawings by reference characters, 4 denotes an elongated tube constituting the body portion of the feeder and is termed a "cylinder." One end of the cylinder 4 is interiorly screw-threaded for receiving the tailpiece 5, the latter being shouldered, as at 6, to enable the tailpiece 5 to abut against the end of the cylinder, as shown in Fig. 2ª. Projecting from the shouldered portion of the tailpiece 5 is a screw-threaded extension 7, which engages with the interior screw-threads of the cylinder 4. The said extension 7 is recessed, as at 8, which communicates with an inlet-port 9, formed in the tailpiece 5, and to the inlet 9 is secured a nipple 10, to which is attached the motive-fluid or air supply pipe 11. The outer end of the tailpiece is pointed, as at 12, so that when the feeder is set up the pointed end of the tailpiece will enter the ground, thereby preventing the feeder from slipping.

Operating within the cylinder 4, as well as being of such length as to project from one end of the cylinder 4, is an elongated piston 13, having the outer end thereof formed solid, as at 14, and the said piston 13 is further provided with an elongated channel 15, which communicates at one end with the recess 8 and at its other end with an outlet-port 16, in which is secured a nipple 17. The periphery of the piston 13 near its inner end is cut away, as at 18, forming an annular shoulder 19, which constitutes an abutment to arrest the movement of the piston 13 out of the cylinder. The shoulder 19 associates with a locking device to be hereinafter referred to. The piston 13 is furthermore provided with a port 19ª, communicating with the channel 15. The port 19ª is arranged near the inner end of the piston 13, and the said port 19ª causes when the piston is near the limit of its stroke in one direction the discharge of the air from the channel 15, such discharge causing a hissing sound and indicating to the operator that the piston 13 is near the limit of its outward stroke. The port 19ª also allows the escape of the air, so that the operator can readily move the piston 13 inwardly when the supply of fluid is cut off from the recess 8. The cylinder 4 at that end opposite to which the tailpiece is connected is provided with exterior screw-threads, and to the said exterior screw-threads is connected a sleeve 20, having an inwardly-extending annular flange at a point intermediate its length, as at 21, its inner face beveled, as at 22, and its inner face further provided with a shoulder, as at 23. The sleeve 20 is furthermore provided with exterior screw-threads with which engages a collar 24, having one end formed with an inwardly-extending annular flange 25. Mounted against the flange 25 and having one end interposed between the end 26 of the sleeve 20 and the piston 13 is a packing-gland 27, and interposed between the end 26 of the sleeve 20 and the piston 13 is a packing-ring 28, and between the packing-ring 28 and the gland 27 and surrounding the piston 13 is arranged a suitable packing 29. Interposed between the shoulder 21 and the end of the cylinder 4 is a washer 30.

The locking device which associates with the shoulder 19 of the piston 13 consists of a plurality of shiftable segment-shaped members 31, which are suitably spaced apart and surround the piston 13. Each of the members has its periphery cut away to form a groove 32, and mounted in the grooves 32 of the members 31 is an annular spring member 33, whose tendency is to keep the members 31 in close contact with the piston. The members 31 are positioned within the sleeve 20 in proximity to the beveled portion 22 of the inner face of the sleeve 20. During the outward movement of the piston 13 the members 31 are held in close contact therewith, and as the piston continues to move outwardly the members 33 will eventually engage the cut-away portion 18, and during the further movement of the piston in an outward direction the shoulder 19 will eventually abut against the members 31, and the outward movement of the piston would then be arrested. This is evident, owing to the fact that the members 31 are arranged in close proximity to the beveled inner face of the sleeve 20, so that if the members are attempted to be carried outwardly by the piston a wedging action would take place, consequently arresting the movement of the piston, as the sleeve 20 is fixed to the cylinder.

The reference character 34 denotes the cylinder of the hammer, which is reinforced, as at 35, and the said reinforced portion 35 is provided with a screw-threaded opening to receive the inner end of a throttle-valve casing 36. Within the casing 36 is positioned a manually-operated throttle-valve 37, which not only acts to close the channel 38 for establishing communication between the valve-casing 36 and the interior of the cylinder 34, but also acts as a means for closing the air-inlet 39, which is arranged in the side of the casing 36. The casing 36 has extending at right angles thereto a nipple 40, which communicates with the inlet 39, and secured to the nipple 40 is one end of a pipe connection 41. The other end of said connection 41 is secured to a T-coupling 42, which is secured to and communicates with the nipple 17. The valve 37 is provided with an elongated stem 43, which projects from the casing 36 and is provided with a finger or handle piece 44. Secured upon the end of the cylinder 34 is a cap 45, which is interiorly screw-threaded and has the solid end 14 of the piston 14 connected thereto. A washer 46 is interposed between the cap and the edge of the cylinder, so as to seal that end of the cylinder. A clamping-nut 47 is provided, so as to prevent separation of the piston 13 from the cap 45.

From the foregoing construction it will be evident that when air is supplied through the tailpiece 5 to the cylinder 5 the piston 13 will be caused to move outwardly from the cylinder, pressing the tool against its work, and the air will also travel through the channel 15 and be discharged at the outlet 15 into the T-coupling and pipe connection 41. From there it will be fed into the valve-casing 36—that is, to say, if the valve 37 is removed from in front of the inlet 39. If the valve is in such position, the air will be supplied to the cylinder 34, and consequently reciprocate the hammer within the cylinder 34, thereby operating the tool. The valve 37 is shifted to open the inlet 39 in the channel 38 manually—that is to say, the operator moving his hand outwardly along the casing 36 to engage the finger or handle piece 44, such action will then shift the valve from closed position. As the piston 13 moves outwardly, the port 19ª will eventually pass clear of the collar 25, and as the air exhausts from the channel 15 through the port 19ª a hissing sound will be had, which will indicate to the operator that the piston is near the limit of its outward stroke. A further movement of the piston outwardly will cause the members 31 to abut against the shoulder 19, thereby arresting any further movement of the piston in an outward direction. After the piston has been shifted by the air to the limit of its stroke in one direction the air-supply is cut off, and the piston is then moved inwardly by the operator. The air exhausting through the port 19ª will enable the operator to readily return the piston back into the cylinder 4. Owing to the extending of the valve-casing 36 at right angles with respect to the cylinder 34, the operator can turn the pneumatic tool by one hand in a convenient manner, and, furthermore, such arrangement of the valve-casing 36 will prevent the flopping around of the air-hose, thereby preventing the tangling and wearing thereof, and at the same time it will be evident that the durability of the air-hose at the point of connection between one end thereof and the tailpiece will be increased. Then, again, the manner of setting up the throttle-valve will enable the operator to readily open and close the valve, when occasion requires, without the necessity of removing that hand which is used to turn the cylinder of the hammer.

Owing the manner of setting up the piston with respect to the cylinder, the former is substantially of the same diameter as the inner diameter of the latter, making a snug fit; but at the same time the fit is such as not to interfere with the movement of the piston when feeding the tool or when returning the piston to normal position. The inner diameter of the cylinder with respect to the diameter of the piston is such that the piston has full bearing for nearly its entire length. In certain types of feeders now in use there is a bearing only at the end of the piston adjacent to the tailpiece and at the point where the piston projects from the end of the cylinder. There is considerable strain on this type of feeders, and with the arrangement just mentioned they are apt to wear out at point of bearing. Such objectionable feature is not present when setting up the feeder with a piston and cylinder in accordance with this invention, as the piston has full bearing for nearly its entire length.

Having thus fully described our invention, what we claim as new, and desire to secure by Letters Patent, is—

1. An automatic feeder for tools comprising a cylinder adapted to be supported at one end, a fluid-operated piston within the cylinder and of a diameter as to snugly fit throughout its length the inner face of the cylinder, said piston connected at one end to the tool to be fed and having a channel terminating at a point removed from the point of connection between the piston and the tool, said piston having its channel open at one end and further provided with a pair of outlets for the channel, one of said outlets communicating with the tool for supplying a motive fluid thereto and the other of the outlets allowing for the escape of motive fluid to the atmosphere so as to indicate to the operator that the piston is near the limit of its outward stroke.

2. An automatic feeder for tools comprising a cylinder adapted to be supported at one end, a fluid-operated piston within the cylinder and of a diameter as to snugly fit throughout its length the inner face of the cylinder, said piston connected at one end to the tool to be fed and having a channel terminating at a point removed from the point of connection between the piston and the tool, said piston having its channel open at one end and further provided with a pair of outlets for the channel, one of said outlets communicating with the tool for supplying a motive fluid thereto and the other of the outlets allowing for the escape of motive fluid to the atmosphere so as to indicate to the operator that the piston is near the limit of its outward stroke, and shiftable means carried by one end of the cylinder and adapted to abut against the piston for arresting the outward movement thereof.

3. An automatic feeder for pneumatic tools comprising a cylinder communicating with a motive-fluid supply, a hollow piston arranged within the cylinder and connected at one end to the tool to be fed, said piston provided with an outlet, an exteriorly-arranged pipe connection communicating at one end with said outlet and at its other end with the tool for supplying motive fluid thereto, and shiftable means connected to one end of the cylinder and adapted to abut against the piston for arresting the outward movement thereof.

4. An automatic feeder for pneumatic tools comprising a cylinder communicating with a motive-fluid supply, a piston arranged within said cylinder and provided with a channel extending from one end and terminating at a point removed from the other end of the piston, said piston further provided with a pair of outlets for said channel and said channel communicating with the interior of the cylinder, one of said outlets adapted to communicate with the atmosphere to allow of the escape of motive fluid to indicate to an operator that the piston is near the limit of its outward stroke, and an exteriorly-arranged pipe connection communicating with the other of said outlets and with the tool to be fed for supplying a motive fluid to the tool.

5. An automatic feeder for pneumatic tools comprising a cylinder communicating with a motive-fluid supply, a piston arranged within said cylinder and provided with a channel extending from one end and terminating at a point removed from the other end of the piston, said piston further provided with a pair of outlets for said channel and said channel communicating with the interior of the cylinder, one of said outlets adapted to communicate with the atmosphere to allow of the escape of motive fluid to indicate to an operator that the piston is near the limit of its outward stroke, an exteriorly-arranged pipe connection communicating with the other of said outlets and with the tool to be fed for supplying a motive fluid to the tool, and means connected to the cylinder and adapted to abut against the piston to arrest the outward movement thereof.

6. An automatic feeder for pneumatic tools comprising a cylinder communicating with a motive-fluid supply, a piston arranged within said cylinder and provided with a channel extending from one end and terminating at a point removed from the other end of the piston, said piston further provided with a pair of outlets for said channel and said channel communicating with the interior of the cylinder, one of said outlets adapted to communicate with the atmosphere to allow of the escape of motive fluid to indicate to an operator that the piston is near the limit of its outward stroke, an exteriorly-arranged pipe connection communicating with the other of said outlets and with the tool to be fed for supplying a motive fluid to the tool, and means carried by one end of the cylinder and adapted to abut against the piston for limiting the outward movement thereof.

7. An automatic feeder for pneumatic tools comprising a recessed tailpiece connected with a source of motive-fluid supply, a cylinder connected to said tailpiece, a hollow piston operating and opening in said cylinder and connected at one end to the tool to be fed, and an automatically-shiftable means engaging the piston for arresting the outward movement thereof.

8. An automatic feeder for pneumatic tools comprising a tailpiece having a recess communicating with a motive-fluid supply, a cylinder connected to said tailpiece and opening into said recess, a piston arranged within and of a diameter as to snugly engage the inner face of the cylinder, said piston having one end connected to the tool to be fed and further provided with a channel opening at one end into the cylinder and terminating at a point removed from that end of the piston connected to the tool, said piston further provided with an outlet for said channel, and an exteriorly-arranged means communicating with said outlet and with the tool for supplying motive fluid to the latter.

9. An automatic feeder for pneumatic tools comprising a tailpiece having a recess communicating with a motive-fluid supply, a cylinder connected to said tailpiece and opening into said recess, a piston arranged within and of a diameter as to snugly engage the inner face of the cylinder, said piston having one end connected to the tool to be fed and further provided with a channel opening at one end into the cylinder and terminating at a point removed from that end of the piston connected to the tool, said piston further provided with an outlet for said channel, an exteriorly-arranged means communicating with said outlet and with the tool for supplying motive fluid to the latter, and an automatically-operable locking device engaging the piston for arresting the outward movement thereof.

10. An automatic feeder for tools comprising a cylinder supported at one end and communicating with a source of motive-fluid supply, a piston operating within said cylinder and connected with the tool to be fed, and a spring-controlled locking device connected to one end of the cylinder and adapted to engage the piston to arrest the outward movement thereof.

11. An automatic feeder for tools comprising a cylinder supported at one end and communicating with a source of motive-fluid supply, a piston operated within said cylinder and having one end connected to the tool to be fed, said piston having its periphery cut away to form a shoulder, and a shiftable locking device connected to one end of the cylinder and adapted to engage the shoulder of the piston to arrest the outward movement of the piston.

12. An automatic feeder for pneumatic tools comprising a cylinder supported at one end and communicating with a motive-fluid supply, a hollow piston operating within said cylinder and having a closed end connected to the tool to be fed, said piston further provided with a peripheral shoulder, means for supplying motive fluid from the piston to the tool, and a spring-controlled locking device connected to the cylinder and adapted to engage said shoulder to arrest the outward movement of the piston.

13. An automatic feeder for pneumatic tools comprising a cylinder supported at one end and communicating with a motive-fluid supply, a hollow piston operating within said cylinder and having a closed end connected to the tool to be fed, said piston further provided with a peripheral shoulder and a pair of outlets, means communicating with one of said outlets for supplying motive fluid from the piston to the tool, and a locking device connected to the cylinder and adapted to engage said shoulder to arrest the outward movement of the piston, the other of said outlets adapted to open into the atmosphere to cause an exhaust of motive fluid to indicate to an operator when the piston is near the limit of its outward stroke.

14. An automatic feeder for tools comprising a hollow cylinder, a recessed tailpiece connected to one end of the cylinder for supporting it and adapted to communicate with a source of motive-fluid supply, a pressure-operated piston within said cylinder, having a bearing for nearly its entire length within the cylinder and adapted to be connected with the tool to be fed, and a shiftable locking device carried by the cylinder and adapted to engage the piston to arrest the outward movement thereof.

15. An automatic feeder for tools comprising the combination with a cylinder communicating with a source of motive-fluid supply and a pressure-operated piston within said cylinder, said piston having a peripheral shoulder, of a plurality of automatically-shiftable stops surrounding the piston and adapted to be engaged by the peripheral shoulder of the piston to limit the outward movement thereof, and means for inclosing the stops.

16. An automatic feeder for tools comprising the combination with a cylinder communicating with a source of motive-fluid supply and a pressure-operated piston within said cylinder, said piston having a peripheral shoulder, of a plurality of spring-controlled stops surrounding the piston and adapted to be engaged by the peripheral shoulder of the piston to limit the outward movement thereof, and means for inclosing the stops.

In testimony whereof we have hereunto set our hands in presence of two subscribing witnesses.

CHARLES TINGLEY CARNAHAN.
JEREMIAH MURPHY.

Witnesses:
H. S. PHILLIPS,
LATIMER FOPLESS.